R. B. CRAIG & A. COFFMAN.
AUTOMATIC VENDING MACHINE.
APPLICATION FILED APR. 12, 1909.

987,702.

Patented Mar. 28, 1911.
11 SHEETS—SHEET 3.

Fig. 3.

Witnesses
Inventors
Robert B. Craig & Albert Coffman
By
Knight Bros
Attorneys

Fig. 6.

R. B. CRAIG & A. COFFMAN.
AUTOMATIC VENDING MACHINE.
APPLICATION FILED APR. 12, 1909.

987,702.

Patented Mar. 28, 1911.
11 SHEETS—SHEET 7.

R. B. CRAIG & A. COFFMAN.
AUTOMATIC VENDING MACHINE.
APPLICATION FILED APR. 12, 1909.

987,702.

Patented Mar. 28, 1911.
11 SHEETS—SHEET 9.

R. B. CRAIG & A. COFFMAN.
AUTOMATIC VENDING MACHINE.
APPLICATION FILED APR. 12, 1909.

987,702.

Patented Mar. 28, 1911.
11 SHEETS—SHEET 10.

Witnesses
C. K. Reichenbach
H. H. Byrne

Inventors
Robert B. Craig & Albert Coffman
By Knight Bros
Attorneys

R. B. CRAIG & A. COFFMAN.
AUTOMATIC VENDING MACHINE.
APPLICATION FILED APR. 12, 1909.

987,702.

Patented Mar. 28, 1911.
11 SHEETS—SHEET 11.

UNITED STATES PATENT OFFICE.

ROBERT B. CRAIG AND ALBERT COFFMAN, OF KANSAS CITY, MISSOURI, ASSIGNORS TO AUTOMATIC VENDING MACHINES COMPANY, OF KANSAS CITY, MISSOURI, A CORPORATION OF THE TERRITORY OF NEW MEXICO.

AUTOMATIC VENDING-MACHINE.

987,702.  Specification of Letters Patent.  Patented Mar. 28, 1911.

Application filed April 12, 1909. Serial No. 489,457.

*To all whom it may concern:*

Be it known that we, ROBERT B. CRAIG and ALBERT COFFMAN, citizens of the United States, and residents of Kansas City, in the county of Jackson, State of Missouri, have invented certain new and useful Improvements in Automatic Vending-Machines, of which the following is a specification.

This invention relates to coin controlled machines of that type wherein a deposited coin actuates means that releases mechanism operable to vend a time printed sheet or card, as for instance an insurance policy, and which machine embodies in its structure certain improvements on a machine of the same character for which applicants have now pending application papers for patent bearing Serial No. 465,182 and dated November 30, 1908.

The improvements in the present invention relates to the recording means and its operating mechanism, the printing mechanism, the ribbon feed mechanism, the coin chute, the releasing detent for the delivery mechanism, and their immediate associated parts; and have for their purpose to render these elements more accurate and of greater simplicity, whereby they are less liable to become inoperative, and require only the minimum amount of attention.

The further purpose of the invention is to provide a coin controlled insurance policy vending machine that may be operated by manual power alone, as distinct from one whose operation is effected by the weight of the person who deposits the coin; and whose operating means is such that it may be actuated at any time but without affecting the vending operation of the machine unless a coin of the prescribed character shall have first been inserted in the coin chute.

The machine embodying these several improvements will be fully described in substantially the order above referred to in the course of the following specification, and the points of novelty thereof set forth in the appended claims.

In the accompanying drawings which show one embodiment of the machine in its structural details, Fig. 19 is a detail view, partly in side elevation and vertical section, of the printing mechanism, Fig. 20 is a detail view of the fly wheel of the crank operating means, and, Fig. 21 is a view of the coin guard release.

In the course of the following extended description, like numerals of reference indicate corresponding parts in the different views shown.

Figure 4:
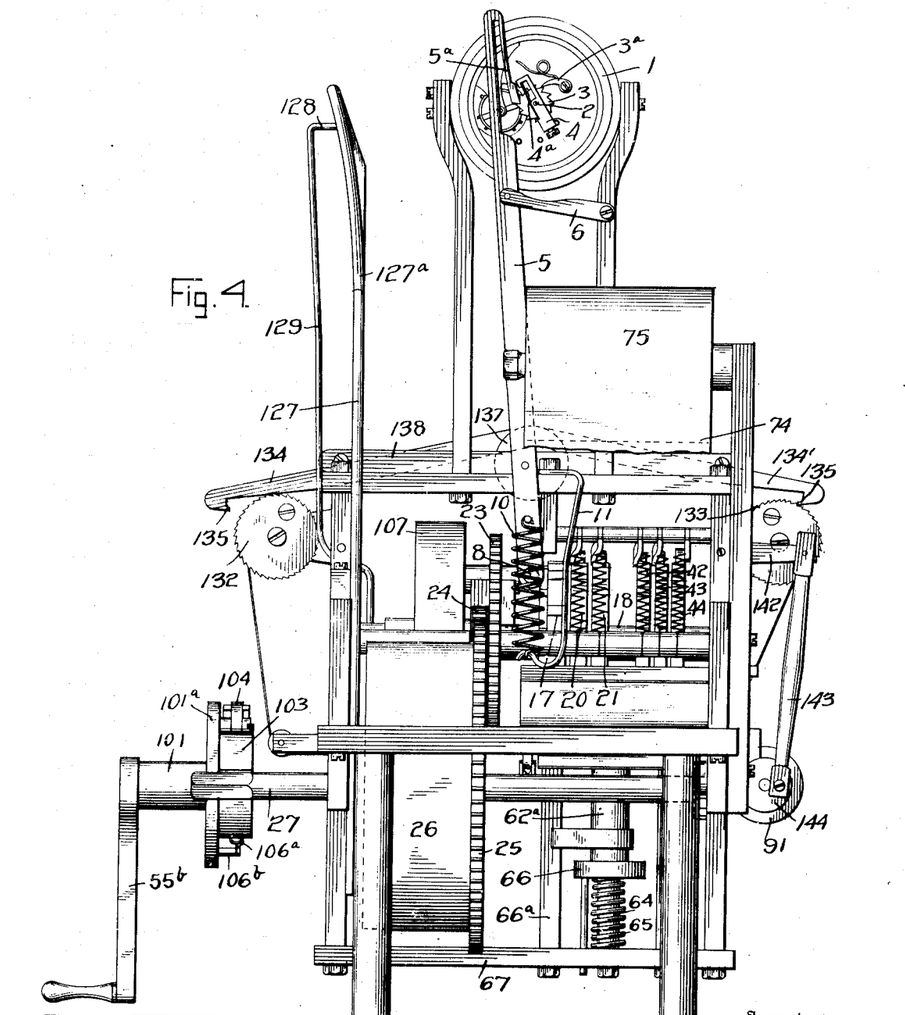
Fig. 4 is a rear elevation.
Figure 15:
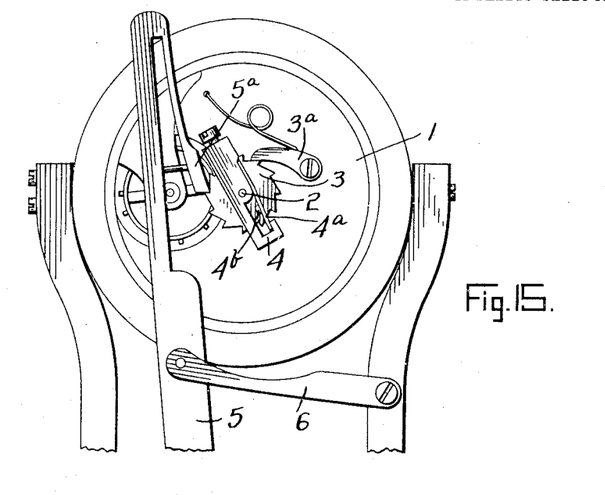
Fig. 15 is a detail view of the time mechanism.

*Time mechanism.*—This feature of the machine is constructed and operates in substantially the same manner as that described of the corresponding mechanism in the patent above referred to, *i. e.*, the time mechanism controls by releasing rather than by actuating the recording mechanism, which control is accomplished through the medium of a detent restraining mechanism that is kept under constant tension, and releases such detent through a connection that is under constant tendency to move in the direction of releasing, so that the time piece restrains rather than imparts the movement. To this end, the time piece 1 carries loosely mounted on its minute arbor 2 a ratchet wheel 3 which has driving connection with said arbor 2, through the medium of a block 4 that is fixed to rotate with the arbor 2. Said block 4 has a leaf spring member $4^a$ against which normally contacts a stud $4^b$ fixed upon the ratchet wheel 3. There are twelve teeth upon the ratchet thus giving them the value of five minutes each, and supported by said wheel through the medium of a substantially resilient pawl 5ª is a spring assisted drop bar 5, which is lowered a distance of one tooth every five minutes as will be obvious, and when so lowered is in position to slide off the tooth, so that it may drop free of the ratchet wheel and release the escapement of the recording mechanism and temporarily release the restraining means therefor, and permit said recording means to advance a distance corresponding to five minutes, the details of which operation will be later described. The bar 5 has pivotal engagement with a link or toggle 6 which is in turn pivoted to the machine frame, and whose function is to prevent the bar 5 from moving sidewise out of engagement with the wheel 3. But when said wheel has rotated under the advancement of the clock mechanism the sidewise movement of the bar 5 necessary to release the bar is permitted. On the completion of this dropping movement of the bar and when the same has performed its function, it is returned upward by a force presently to be described, and in which upward movement the pawl or resilient member 5ª of the bar is adapted to override the engaged tooth of the ratchet wheel (see Fig. 15). As shown in Fig. 4 the bar 5 carries adjacent its lower end a spiral spring 10 fixed to a bar 11 that is in turn fast on the machine frame. The function of the spring 10 is that of assisting the downward movement of the bar 5 and cause the same to turn the ratchet wheel 3 whereby to actuate the arbor 2 of the clock mechanism. At its extreme lower end the bar 5 has a substantially loose connection with the free end of an escapement lever 12, so that when the bar 5 drops, it depresses said lever, (see Fig. 9) causing the same to turn upon its pivot 13. In order that the time piece may continue under the influence of driving energy during the interval when the bar is down, or released from the wheel 3, a dog 3ª on a fixed part of the clock mechanism engages with one of the ratchets of the wheel 3 and prevents any likelihood of its having reverse movement, and which stop will be likewise effective during the upward movement of the bar 5 when the pawl 5ª is being returned to engaged position.

Figure 5:
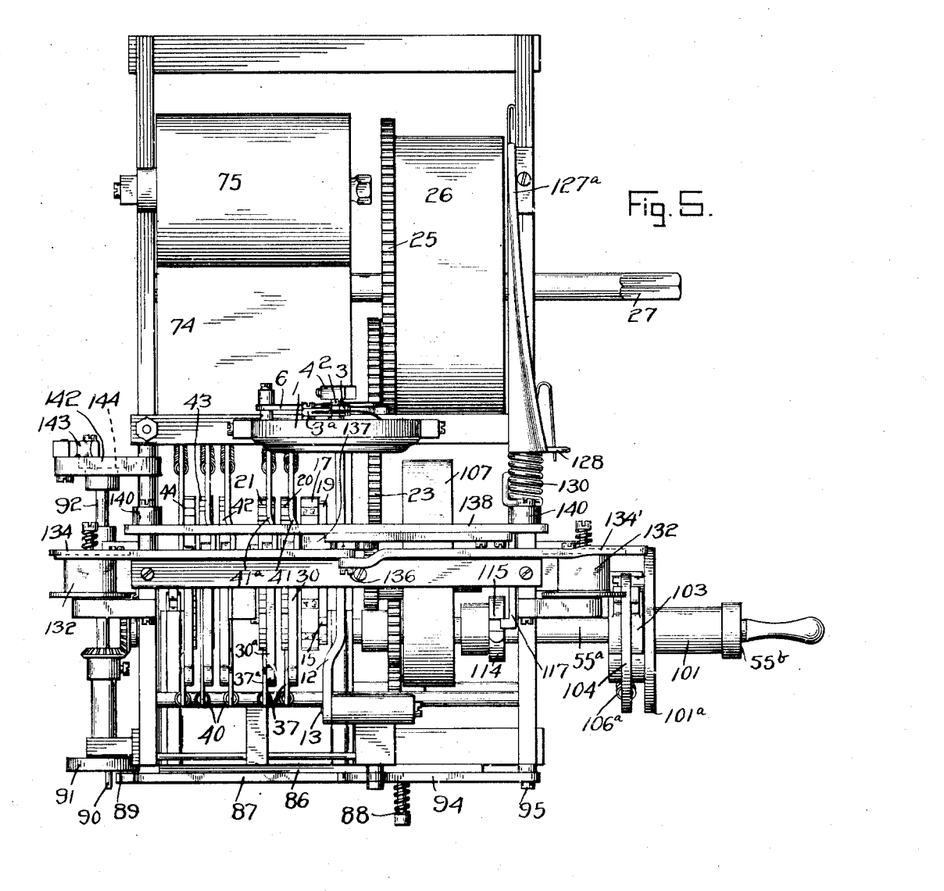
Fig. 5 is a top plan view.
Figure 9:
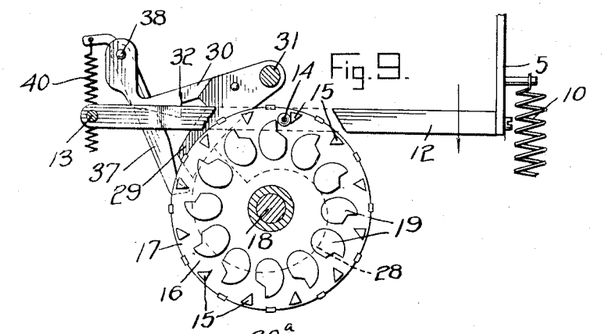
Fig. 9 is a detail view of the escapement of the time recording mechanism, released at predetermined intervals by the time mechanism.

*Time recorder escapement.*—Referring to Figs. 5 and 9, it will be seen that the escapement lever 12 is pivoted at 13 and carries a stop 14 normally lying in the path of segmental stops 15 of which there are twelve disposed at equal distances around the face of the minutes wheel 17 of the time recording mechanism. Said time recording mechanism, as will be hereinafter described, has its first or minute wheel fixed against rotation upon a shaft 18 which is subjected to constant driving force as will be further described. The shaft 18 is common to all of the wheels or disks constituting the recording mechanism. Wheel 17 is further provided with a plurality of deflecting cams 19 disposed intermediate the segmental stops 15, and have for their function to engage the stop 14 of the arm 12 when said arm is depressed and act to throw said stop up into the path of the next segmental stop 15. The cams 19 thus become the means for returning lever 12 to its normal position, and in performing this function, they likewise restore the drop bar 5 to its upper position where it again engages with the time releasing mechanism.

Figure 1:
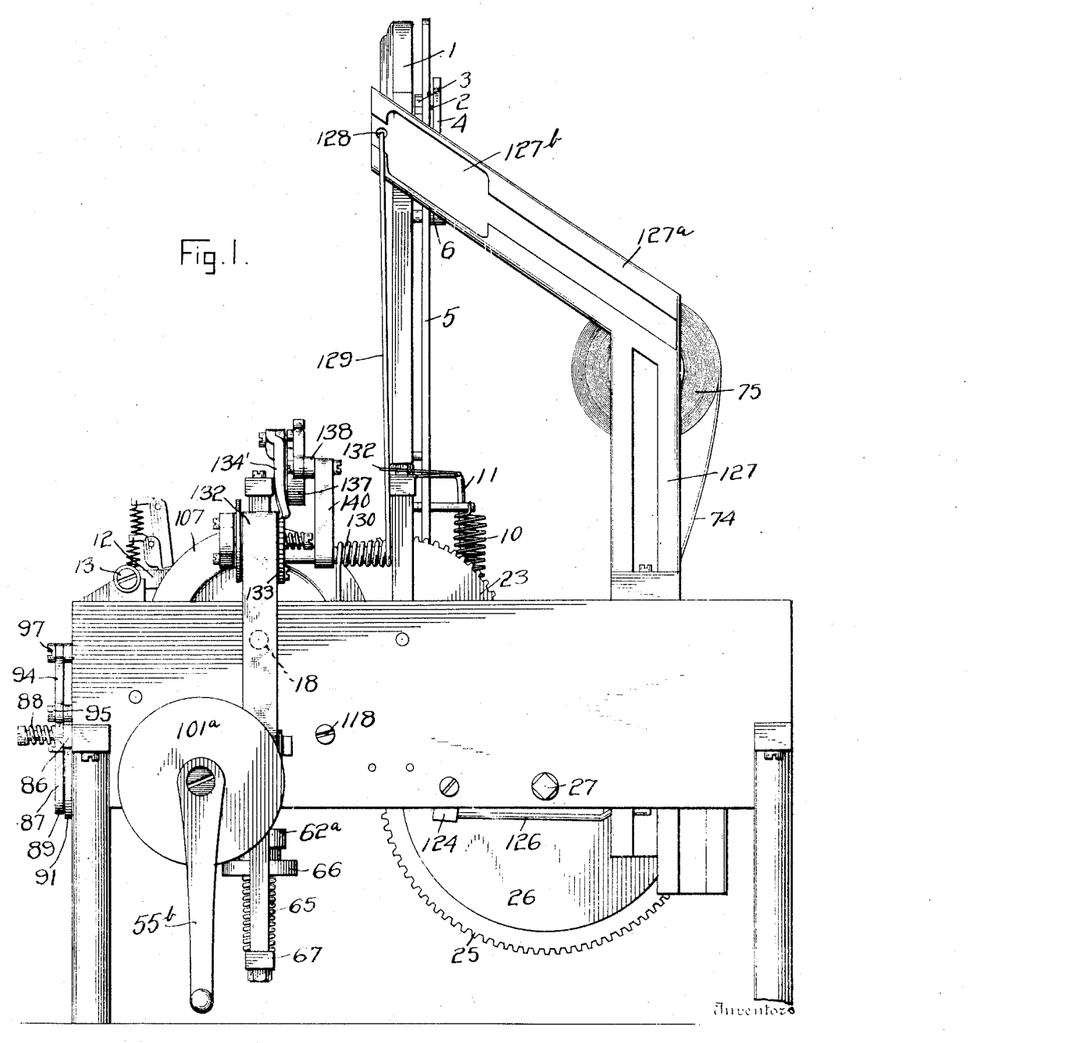
Figure 1 is a view in elevation of one side of the machine.
Figure 2:
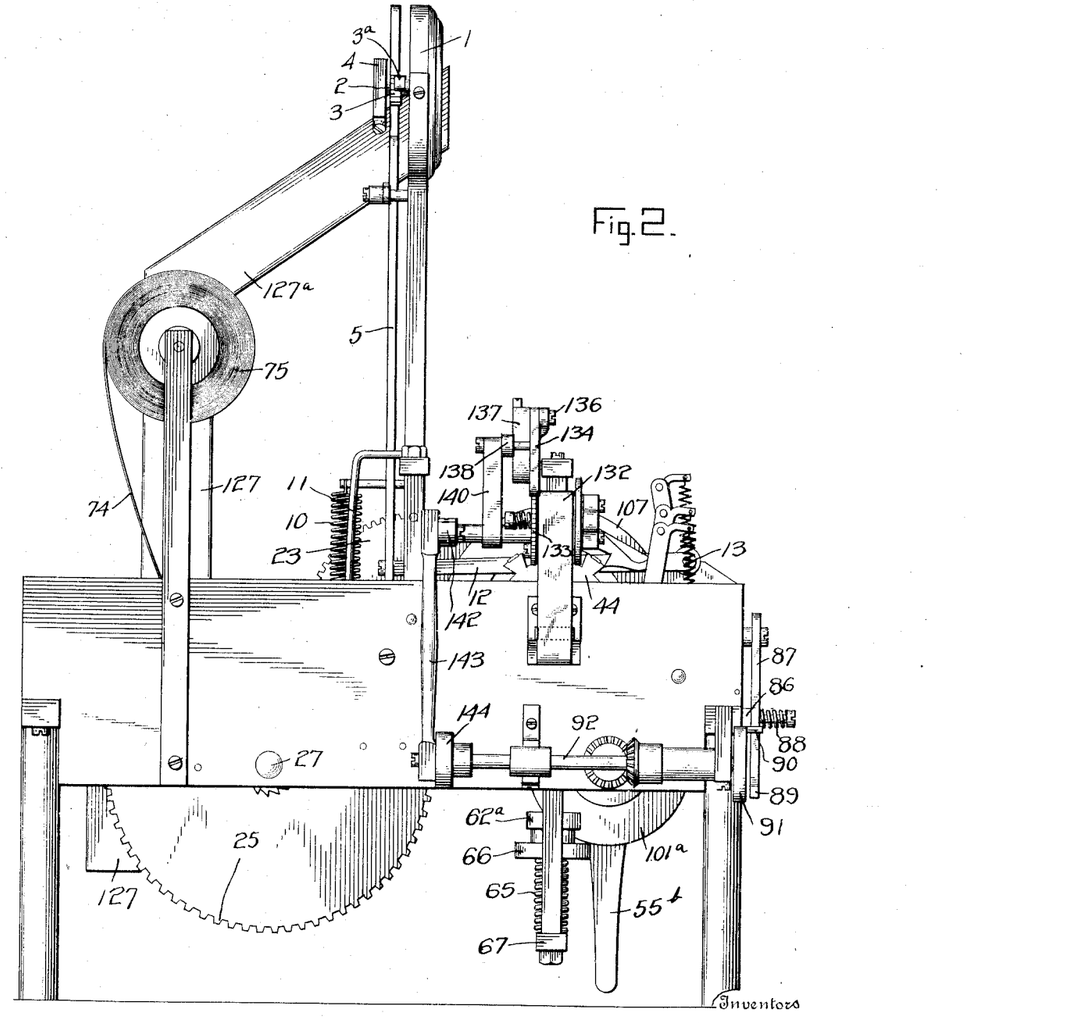
Fig. 2 is a like view of the opposite side of the machine.
Figure 3:
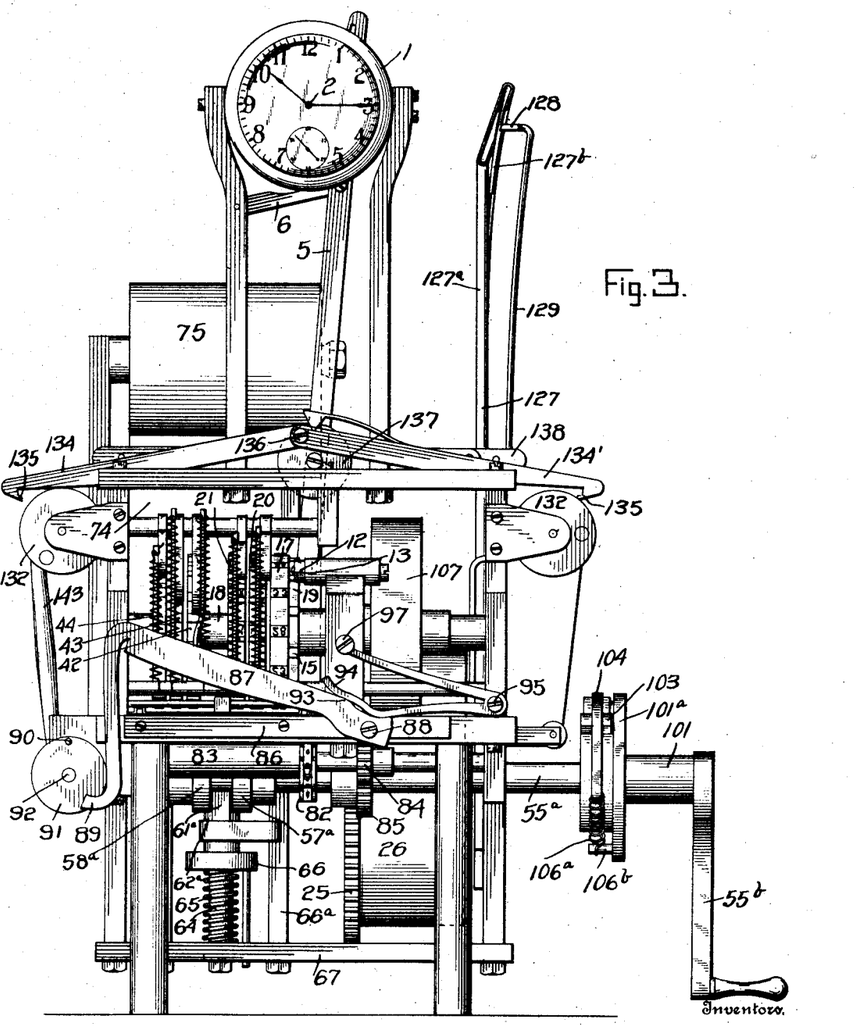
Fig. 3 is a front elevation.

*Recording mechanism.*—Again referring to Figs. 3 and 5 it will be seen that the recording mechanism comprises two sections, one of which serves as a time recording means and the other as a date recording means; *i. e.*, the former records the hour and minute divisions of the day, while the latter section records the divisions of a year. As will hereinafter appear both of these recording means are actuated through a single driving motor as distinct from two independent driving motors which is the case in our other machine above referred to. As in the former instance these two sections of the recording means are dependent in action; *i. e.* the successive wheels of the time recording means are driven *seriatim*, so as to shift every five minutes and thus be in position to record within five minutes the exact time of any sale, and also the last wheel of the time series, after having completed a revolution corresponding to 24 hours releases a detent that permits a movement of one step in the dating series so as to change the day.

*Time recorder.*—The time recorder comprises the minutes wheel 17, the hours wheel 20 and the meridian wheel 21. And as has been already stated, said minutes wheel is fixed relatively to the shaft 18 which shaft is driven through the gear train 22, 23, and 24, from the toothed wheel 25 of the spring drum 26 which may be wound through an arbor 27. Wheel 17 is thus under constant tendency to rotate, but is normally restrained by the escapement cams 19, that are controlled by the time mechanism, as already described. Said wheel carries upon its periphery twelve printing characters, indicating times at five minute intervals. These time intervals are arbitrary, so long as they bear proper relation and thus adapt the wheel to indicate within five minutes the exact minute of sale, but as set forth in the specification of our pending application, it is preferred to commence the series at a point other than the exact meridian which would necessitate the use of an extra wheel to distinguish between twelve o'clock noon and twelve o'clock midnight. Thus the series commences at .03 minutes and runs thence .08, .13, .18, etc. As will be seen by reference to Figs. 9 and 10 the minutes wheel carries on its face opposite the escapement a cam 28 (shown in dotted lines in Fig. 9) which cam is of such structure as will cause it to engage the arm 29 of a bell crank lever 30, once in each revolution of the minute wheel 17, and swing said bell crank upon its fulcrum 31 in order to remove its engaging shoulder 32 from the notch 33 of the next adjacent or hour wheel 20 and render the same free to rotate. Continuing its travel, the cam 29 raises the bell crank lever 30 carrying a dog 37 pivoted thereto at 38, and causes the same to move upwardly into position for engagement with the peripheral notches of the wheel 20 and on its return to impart rotation to said wheel. This movement takes place when the wheel 17 completes the last step of its complete revolution, i. e. when it moves from a position in which it represents 58 minutes at the printing point to the position in which it represents .03 in the starting point, and in doing this it effects one step in the revolution of wheel 20 and brings the next hour designation of the last named wheel into the printing position. On that face of the hour wheel 20 remote from the minute wheel 17 is a cam 39 (shown in dotted lines in Fig. 10) which cam acts in every respect similar to the cam 28 in establishing driving connection between the hours wheel 20 and the meridian wheel 21; i. e. it engages the arm 29ª on the bell crank lever 30ª fulcrumed at 31ª and after lifting said bell crank with its dog 37ª permits the same to drop and thereby imparts one step in the revolution of the wheel 21. The periphery of the wheel 21 may contain any number of printing surfaces, but in the present instance it is preferably provided with characters A. M. and P. M. for designating the meridian of the hour printed by the hours wheel in substantially that manner described of the other machine. As clearly set forth in the specification in our co-pending application the five minute intervals are so selected that no time designation will ever coincide with noon or midnight, thereby making it unnecessary to have any additional designation for this purpose.

Figure 10:
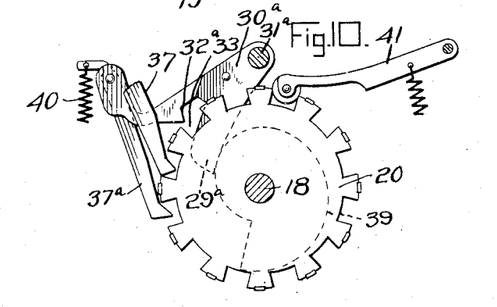
Figs. 10 and 11 are respectively its immediate coöperating recording wheels, and show their respective operating means.
Figure 11:
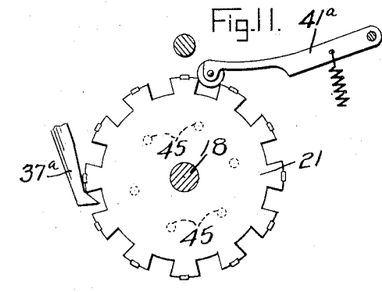
Figure 12:
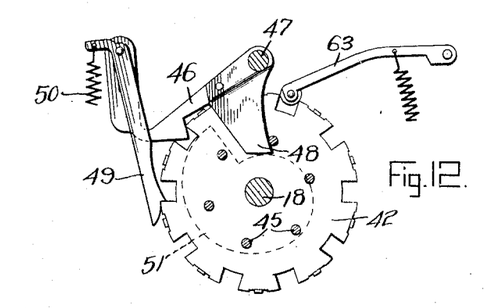
Fig. 12 is a detail view of the escapement of the motor driven gear wheel that actuates a second series of recording wheels utilized to date the article sold, which escapement is under the control of the time recording means.
Figure 13:
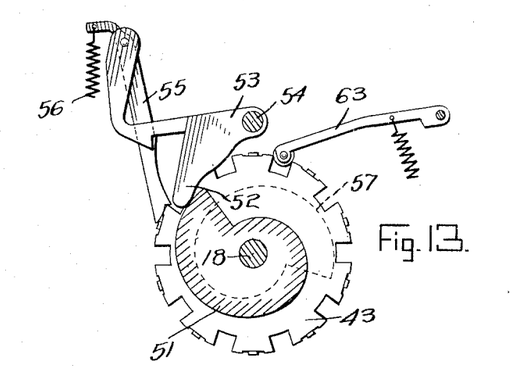
Figs. 13 and 14 are detail views showing the detent and advancing means in the second and third wheels of the dating series.
Figure 14:
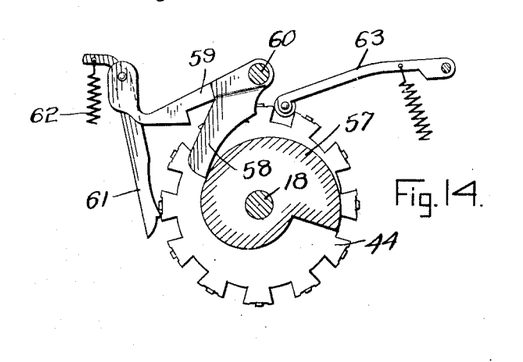

For returning the bell crank levers with their dogs 37 and 37ª and causing the latter to engage with and operate the disks 20 and 21, there is provided for each of said dogs a tensioning spring 40 having one of its ends fixed to the frame. The springs 40 which act upon the dogs and bell cranks are connected with the former at points beyond their fulcrums and thus serve the double function of throwing the dogs into position for engagement with the wheels and tending to turn the bell cranks in the direction of their proper movement. To prevent movement of the wheels 20 and 21 beyond a distance of one step there is provided for each wheel a spring controlled arresting stop 41 and 41ª.

*Dating means.*—The dating principle adopted in this machine is substantially the same as that disclosed in our co-pending application, which principle is by utilizing the ordinal numbers of the days in the year for expressing the date of each day. Thus number "1" associated with the word "year" previously printed upon the blank, will indicate that the policy was sold on the first day of the year or Jan. 1st; the number "50" would indicate that the policy had been sold on Feb. 19th, and so on throughout the calendar. To effect this it is necessary to have only three registering wheels, each of which carries the nine digits together with the zero, so that by proper composition of the three wheels any date from 1 to 365 or 366 may be expressed. To this end the dating means in the present invention comprises a units wheel 42, a tens wheel 43 and a hundreds wheel 44 (see Figs. 3, 11, 12, 13 and 14). All of these wheels are, as above stated, loosely mounted upon a common shaft 18, and the transmission means for said wheels comprises studs 45 of which there are six mounted on the wheel 21 of the time recorder and on that side next the dating wheel 42. Each of the studs 45 corresponds to an a. m. and a p. m. division on the wheel 21 so that with each changing of the day one of the studs 45 actuates mechanism that turns the first day wheel 42 to move it the distance of one division, whence it changes the numeral designation for the next succeeding day.

The mechanism for effecting the transmission of power from the last timing wheel to the first dating wheel comprises a bell crank lever 46 that is journaled at the point 47 and has a depending and offstanding arm 48 lying normally in the path of the studs 45 of the wheel 21. The bell crank 46 likewise carries a dog 49 the purpose whereof is to transmit movement to the next wheel 43 of the dating series. In the turning of the wheel 21 the stud 45 that is in contact with the arm 48 gradually turns the bell crank 46 upon its pivot 47 and raises the dog 49 to its position for engagement with the wheel 42, and the further turning of the wheel 21 causes the engaging stud 45 to pass under the arm 48 whence the bell crank 46 is pulled downwardly under the tension of spring 50 which spring at the same time causes the dog 49 to be kept in engagement with the wheel 42 and to turn said wheel the distance of one point. The opposite face of the wheel 42 is provided with a cam 51 shown in dotted lines in Fig. 12 and in full lines in Fig. 13. The function of the cam 51 is that of engaging with the arm 52 of a bell crank 53 journaled at 54 and turn said bell crank into substantially that position shown in Fig. 13 when the dog 55 carried thereby is brought into engagement with one of the projections on the wheel 43. The further turning of the wheel 42 causes the cam 51 to ride free of the arm 52 whence the bell crank 53 with the pawl 55 is impelled downwardly under the tension of spring 56 and turns the wheel 43 a distance of one point. The opposite face of the wheel 43 carries a like cam 57 (shown in dotted lines in Fig. 13 and in full lines in Fig. 14) whose function is precisely that described of the cam 51, i. e., that it engages with the arm 58 of the bell crank 59 journaled at 60 and raises said bell crank with its dog 61 into such position that on the release of the arm 58 from said cam the pawl 61 will be caused to actuate the wheel 44 the last of the dating series a distance of one point. The several wheels of the dating series are held against improper movement by spring controlled detents 63. As there is but one definite upward and downward movement of the bell crank 46 the actuation of the wheel 43 takes place only at the completion of the revolution of the units wheel 42, or in the movement of the units wheel by which it brings the zero into the printing position so that in composition with the digit of the tens wheel, it prints 10, 20, etc. In like manner the tens wheel 43 of the dating series operates the bell crank 53 and causes it to actuate the hundreds wheel 44 one step as the tens wheel 43 completes its revolution.

Figure 6:
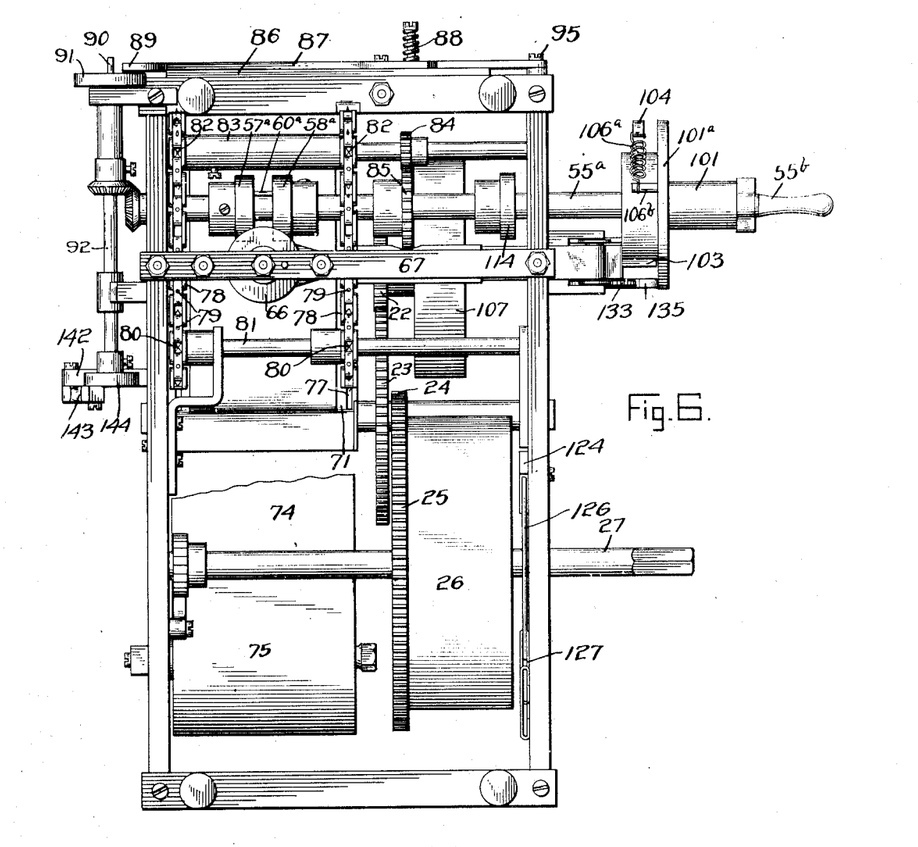
Fig. 6 is a bottom plan view.
Figures 19, 20, 21:
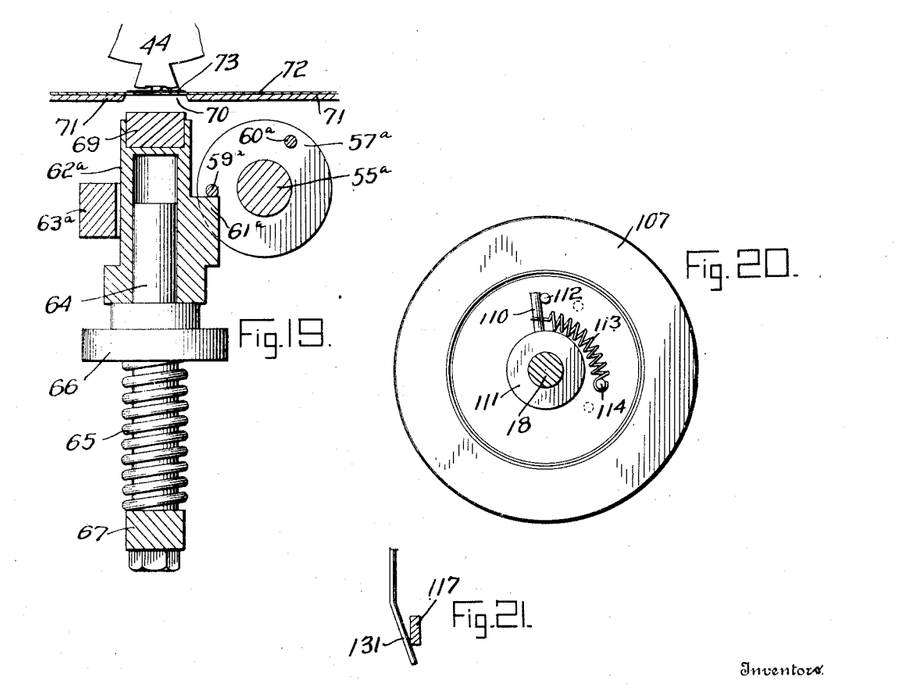

*Printing mechanism.*—From the foregoing description it will be seen how the printing characters arranged upon the several wheels of the recording mechanism are composed for the purpose of expressing the time or fraction of the day by hours and five minute intervals. The printing operation occurs directly beneath the shaft 18 upon which the disks or wheels are mounted. In order to produce impressions from these printing characters upon the policy or other article vended, a shaft 55$^a$ (see Figs. 3, 5, 6 and 19) is adapted to be driven one revolution for each article to be vended by any suitable means, such for instance as a hand operated crank 55$^b$ and whose detailed manner of operation will be later described. The shaft 55$^a$ is provided with a pair of disks 57$^a$ and 58$^a$ keyed thereon (see Figs. 6 and 19), which disks have on their inner faces oppositely projecting pins 59$^a$ and 60$^a$ while a shoulder 61$^a$ carried by a plunger 62$^a$ guided in a bearing 63$^a$ and vertically movable upon a post 64, projects into the path of said pins 59$^a$ and 60$^a$ so as to be depressed thereby, successively, as said shaft 55$^a$ rotates. The plunger 62$^a$ comprises a substantially cylindrical shell in the recessed portion of which fits the post 64 which post is provided with an equalizing and impelling spring 65 that surrounds said post. The spring 65 has a fixed connection with a collar 66 carried by the post 64 and at its opposite end said spring is fixed to a bar 67 forming part of the machine frame. The collar 66 is cut away on its peripheral edge to receive the guiding post 66$^a$ whose function is to guide the plunger in its true path of operation. Each time the plunger 62$^a$ is depressed by a pin 59$^a$ or 60$^a$ and thereafter released by the pin passing out of the path of the shoulder 61$^a$ spring 65 throws the plunger upward and by reason of the resilient connection between the plunger and its guiding post 64 the blow of the plunger is slightly cushioned before the final limit of its upward movement. The return movement of the plunger is in like manner cushioned by the spring 65. The plunger carries a cushioning block or platen 69 at its upper end which works through an opening 70 in the bed plate 71 and forces the web of paper 72 together with the interposed inking ribbon 73 against the printing surface made up of the characters on the recording wheels. In Fig. 19 is shown one of these wheels (44) in position for effecting registration.

Inasmuch as there are two pins 69$^a$ and 60$^a$ which successively engage the shoulder 61$^a$ and depress the plunger during a single revolution of shaft 55$^a$ two imprints are made during each revolution of said shaft. This is of special advantage in the sale of articles which require the two parts requiring identical marking such as the date and the time to be placed upon the insurance policy whereby one may serve as a positive identification means for the other. And since both impressions are made substantially at the same time, and through the same means, it is obvious that the impressions will be uniform. Moreover, the equalizing tendency of the spring 65 so reduces the duration of contact between the paper and ribbon that the feed of the paper is practically infinitesimal at that instant, thus removing any tendency to blur.

*Feeding and delivering mechanism.*—The paper 74 is fed from a roll 75 supported upon the machine and passes over the bed plate 71 until it receives its impression in substantially that manner described of the paper feeding mechanism in our co-pending application. In its further operation the paper feeding mechanism is in all respects similar to that described in the application above referred to in that the sheet passes over the plate 71 which is recessed at 77 (see Fig. 6) to admit the spurs 79 of the two endless chains 78, which spurs contacting with the marginal side edges of said sheet feed the same at a predetermined rate at and to a certain extent. Chains 78 are mounted upon a pair of idle sprockets 80 on a shaft 81 and driving sprockets 82 on a shaft 83, which shaft is geared through pinions 84 and 85 to the crank operated shaft 55ª. By thus feeding the paper by the same means that actuates the recording mechanism, it will be obvious that blank forms will always be presented in the proper relation to receive the distinguishing imprint and to be severed from the paper web on the proper lines of division.

*Severing device.*—The means for severing the projected sheet of paper bearing the time imprint is precisely the same and is actuated in the same manner as the corresponding mechanism disclosed in the copending application hereinbefore referred to, and it need not therefore be described with any precision in the present case. A brief description, however, will be given here in order that a complete machine with all its operative details may be embodied in this application. As the sheet of paper emerges from the front of the machine the severing device is timed to actuate. In emerging through the machine the sheet passes over a fixed knife 86 coöperating with which is a movable knife 87 pivoted at 88 and tensioned to hold substantially that position shown in Fig. 3 by a spring 94 that has a two-point bearing thereon. The spring 94 is fixed at the two points 95 and 97. With the turning of the disk 91 a pin 90 carried thereby engages under the toe 89 and lifts the knife 87 against the tension of the spring 94 and when released the knife 87 is forced downwardly to sever the sheet.

*Driving mechanism.*—The motor for actuating the recording mechanism is likewise of substantially the same type as that for operating the corresponding mechanism in the other machine excepting that in the present instance a single motor is used to operate both series of recording wheels as distinct from an independent motor for operating each series which is the case in the former machine. The present motor used is of such type as to readily insure the operation of the machine for any reasonable predetermined period, say, for one week or eight days. The motor 26 which is preferably of the spring type is wound from an arbor 27 and through the train of gearing 22, 23 and 24 normally tends to exert turning movement to the shaft 18, the movement of which shaft is restrained through the medium of the time controlled detent mechanism heretofore described, (see Figs. 9 and 15). When such restraint is removed said shaft is turned through the medium of the motor and the minute wheel 17 caused to operate.

In order to prevent too sudden impulses in the spring operated driving mechanism there is provided an inertia wheel 107 mounted upon the shaft 18 which carries both series of recording disks. The inertia wheel is mounted loosely upon said shaft, and is, with the shaft 18, provided with members 110, 111, 112, 113 and 114 whereby a resilient connection is effected precisely similar to that described of the inertia wheel in our co-pending case and since its operation in the present instance is identically the same as that referred to a further description of this feature of the machine need not be entered into here.

Figure 16:
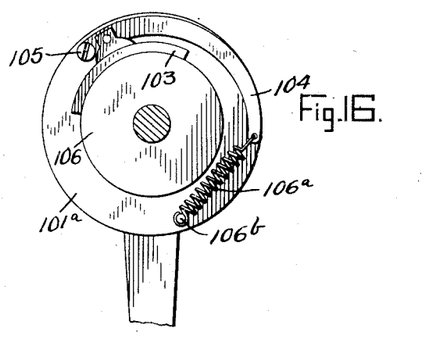
Fig. 16 is a detail view of the clutch mechanism of the operating crank.

The means for operating the printing, delivering, and severing mechanisms comprises the hand operated crank 55ᵇ mounted upon a sleeve 101 and which sleeve in turn carries a disk 101ª. These several members are mounted free to rotate upon the shaft 55ª. The means for effecting a positive connection between the hand crank 55ᵇ and the shaft 55ª whereby the latter may be rotated comprises a friction shoe 103 that is carried by an arcuate arm 104 pivoted to the disk 101ª at 105. The friction shoe is held normally in contact with a smaller disk 106 fixed to the shaft 55ª by a spring 106ª, one end of which spring is fixed to a pin 106ᵇ carried on the inner face of the larger disk 101ª. The frictional connection between the disk 106 and the shoe 103 is such that there may be relative movement between them; *i. e.* the shoe 103 may smoothly override the periphery of the disk 106 without causing the latter to have any movement. The means by which the shoe 103 and disk 106 may positively engage in order to rotate the shaft 55ª is effected when the shaft 55ª is released through the medium of the coin controlled detent mechanism by a coin deposited in the coin chute. It will therefore be clear that by reason of this peculiar manner of effecting the operation of the machine by a hand crank that is permanently exposed will serve in the capacity of a safe guard against the likelihood of the machine mechanism being rendered inoperative through any tampering of the hand lever which tampering must necessarily be reckoned with in machines of this character especially when the same are stationed in places remote from the observance of an overseer.

Figure 17:
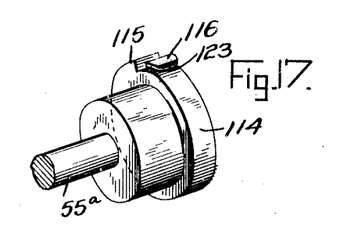
Figs. 17 and 18 are detail views of the coin released detent for the delivery mechanism.
Figure 18:
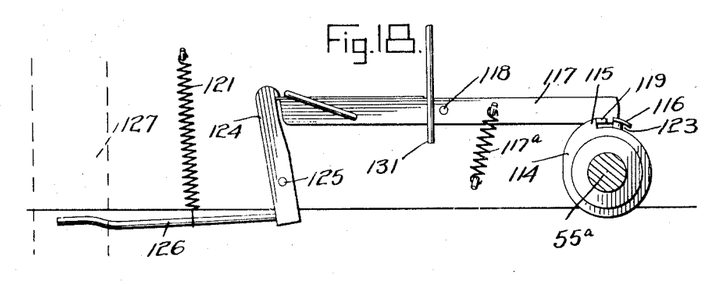

*Coin controlled means.*—The shaft 55ª carries a cam disk 114 provided with a shoulder 115. A lever 117 fulcrumed at 118 carries a pin 119 that normally lies between the shoulder 115 and stop 116. A spring 117ª anchored to the machine frame normally tends to keep the pin 119 in contact with the periphery of the cam 114. The stop 116 is recessed on its under side 123 so that when the pin 119 is depressed it may pass through the recess 123, and permit the cam disk 114 and the shaft 55ª to rotate. The several parts just described and their manner of operation is substantially that set forth in the co-pending application hereinbefore referred to. The opposite end of lever 117 is engaged by a detent 124 pivoted at 125 and normally held in engagement with said lever by the spring 121 that has one end anchored to the machine frame. An arm 126 extending from the detent 124 on the opposite side of its fulcrum 125 projects into the path of a coin in the coin chute 127, in which position it is adapted to be struck by a coin deposited in the chute and cause the detent 124 to release its engagement with the lever 117 whereupon the latter is caused to disengage from the cam disk 114 and permit the operation above described.

The rotation of the shaft 55ª feeds the paper, imparts a double impress to the printing impulses and actuates the severing device as described. Simultaneous with these operations the cam disk gradually raises the pin 119 in opposition to the spring 117ª and causes the several immediate associated parts of the detent mechanism to assume that position when the machine is ready to receive another deposited coin.

*Coin receptacle.*—The coin receptacle comprises a chute 127 having an upwardly disposed and a forwardly inclined length 127ª which terminates in any appropriate position adapted to receive the coin to be inserted. The portion 127ª of the chute is slightly inclined or tilted and has on its under face an aperture 127ᵇ of such dimensions that any coin other than of the denomination prescribed will, by reason of the incline, fall through the opening 127ᵇ and into any suitable receptacle provided for the purpose.

To guard against the depositing of a coin in the coin receptacle should the machine become out of order, and also to close the depositing entrance to the coin chute during the operation of the machine, there is provided a barrier 128 carried by a staff 129 which is fulcrumed at 130 and extends thence downwardly and terminates with an angularly disposed portion 131 (see Fig. 21), which portion normally lies in contact with one side of the lever 117 which in its normal position tends to keep the staff 129 upright when the barrier 128 is clear of the coin passageway. When the lever 117 is actuated it releases its engagement with the member 131 of the staff 129 and permits said staff under the tension of a spring 132 to be thrown inwardly, whereby to cause the barrier 128 to close the entrance to the coin chute.

Figure 7:
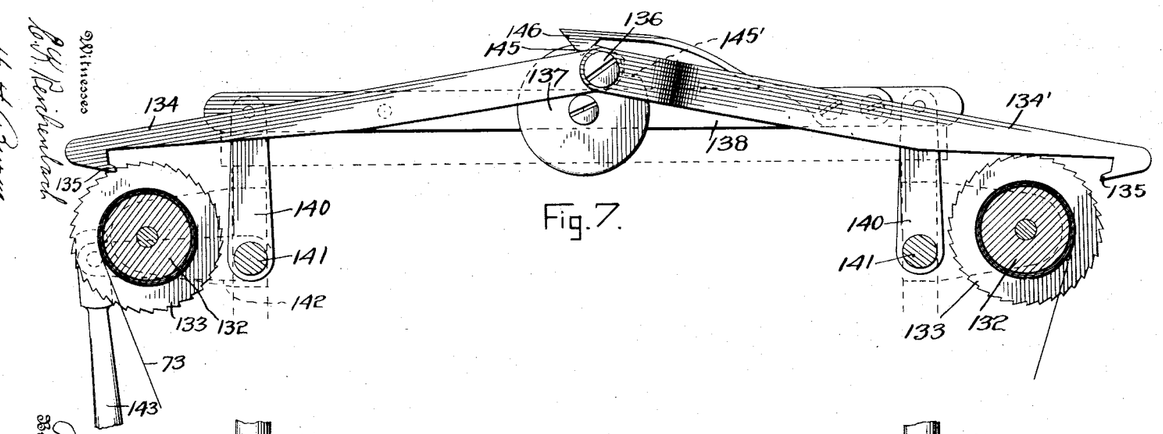
Figs. 7 and 8 are respectively a side elevation and top plan view of the ribbon feed mechanism.
Figure 8:
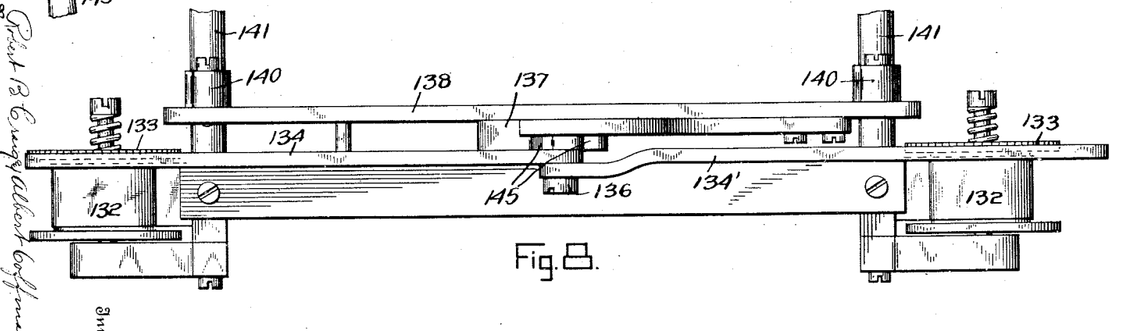

*Ribbon feeding mechanism.*—The means for feeding the ribbon step by step at each impression of the recording mechanism and for automatically reversing the direction of feed whenever the ribbon reaches the end of its travel in either direction is shown in full detail in Figs. 7 and 8. The ribbon 73 is wound upon a pair of bobbins 132 each provided with a ratchet 133 with which coöperate a pair of oscillating arms 134 and 134' whose ends are designed to constitute pawls 135. The arms 134 and 134' are pivotally secured at a common point 136 on a disk 137 that is in turn centrally pivoted to a reciprocating bar 138, which bar is mounted upon the upper ends of a pair of parallel arms 140 projecting from rocking shafts 141, one of which has an arm 142 connected by a pitman 143 with a crank disk 144 upon the shaft 92, which as has already been described executes a revolution at each operation of the machine. The disk 137 is provided with a pair of notches 145 adapted to receive a detent 146 whose function is to hold said disk 137 against rotation during the reciprocation of the bar 138 and thereby keep one of the pawls 135 in position to engage the teeth of its respective ratchet for actuating the same, and at the same time to keep the opposite pawl free from engagement with its ratchet. When the ribbon is wholly unwound from the bobbin opposite to that upon which it is being wound, and its end is anchored fast to the empty bobbin, the resistance of the engaged ratchet with its pawl causes the active arm 134 or 134' to pull upon the disk 137 and partially rotate the same. The detent 146 then engages with the other notch 145 and thereby brings the opposite pawl into engaging position with its respective ratchet, and at the same time releases the just active pawl and thus reverses the direction of feed of the ribbon. This operation of the ribbon reversing means occurs automatically whenever the ribbon has reached the limit of its feed in one direction.

Having thus described our invention, what we claim as new therein and desire to secure by Letters Patent is:—

1. The combination of a time piece having an arbor, a toothed wheel loosely mounted on said arbor, a block fixedly mounted on the arbor, and having engagement with the toothed wheel, and a means for turning the same, a gravity actuated bar having a resilient pawl engaging with and supported by said toothed wheel but released therefrom at predetermined intervals, said bar effecting the actuation of the time piece when moving in the direction of release, and a recording mechanism controlled by said drop bar.

2. The combination of the time piece having a toothed wheel, a drop bar supported by said toothed wheel, a pivotally mounted arm for guiding the drop bar, and the recording means controlled by said drop bar; said drop bar and arm constructed to permit lateral relative movement between them when the drop bar reaches the point of release from the toothed wheel.

3. In a recording mechanism, comprising a plurality of rotary disks having characters adapted to collectively indicate time, and means whereby one rotary member controls another consisting of a bell-crank lever having pivotally mounted on one arm thereof a dog engaging the member to be controlled, a tensioning spring secured directly to said dog and tending to hold the dog in engagement with said member, said arm carrying the dog being provided with a projecting portion constituting a detent for one of the disks, and the other arm of said lever engaging with a cam on the member from which the control is exercised.

The foregoing specification signed at Kansas City, Mo., this 13th day of March, 1909.

ROBERT B. CRAIG.
ALBERT COFFMAN.

In presence of two witnesses—
V. HUNDLEY,
O. BURKE.